United States Patent [19]  [11] Patent Number: 4,528,001
Yokogawa et al.  [45] Date of Patent: Jul. 9, 1985

[54] METHOD OF RECOVERING VOLATILE ORGANIC MATTERS

[75] Inventors: Tetsuya Yokogawa; Ryuhei Futami, both of Yokohama; Saburo Kawahara, Kawasaki, all of Japan

[73] Assignee: The Kanagawa Prefectural Government, Kanagawa, Japan

[21] Appl. No.: 238,103

[22] Filed: Feb. 25, 1981

[51] Int. Cl.³ .................... B01D 47/02; B01D 53/14
[52] U.S. Cl. .......................................... 55/37; 55/45; 55/48; 55/85; 55/89
[58] Field of Search ................. 55/37, 45, 48, 63, 64, 55/85, 88, 89; 210/634

[56] References Cited

U.S. PATENT DOCUMENTS

| 1,946,489 | 2/1934 | de Jahn | 55/37 |
| 2,377,049 | 5/1945 | Souders, Jr. | 55/37 |
| 2,395,362 | 2/1946 | Welling | 55/37 |
| 2,659,453 | 11/1953 | Robinson | 55/37 |
| 3,016,985 | 1/1962 | Akin | 55/37 |
| 3,393,137 | 7/1968 | Altman et al. | 210/634 X |
| 3,633,339 | 1/1972 | Wiewiorowski | 55/37 |
| 3,915,674 | 10/1975 | Smith | 210/634 X |
| 4,056,462 | 11/1977 | Li et al. | 210/634 X |
| 4,102,983 | 7/1978 | Yamase et al. | 55/88 X |
| 4,263,019 | 4/1981 | Minkkinen | 55/37 |
| 4,265,944 | 5/1981 | Garner | 55/48 X |

Primary Examiner—Robert Spitzer
Attorney, Agent, or Firm—Birch, Stewart, Kolasch & Birch

[57] ABSTRACT

A method of recovering volatile organic matter such as fuels and organic solvents from a gas or gas mixture containing the organic matter, characterized by subjecting a gas or gas mixture, having diffused thereinto sparingly water-soluble or water-insoluble volatile organic matter in the form of vapor, mist and/or small droplets, to a two-step capturing treatment wherein the gas or gas mixture is first brought into gas-liquid contact with an aqueous capturing system capable of dissolving the volatile organic matter thereby capturing the organic matter in the form dissolved in the aqueous system and then the organic matter-containing aqueous system is brought into liquid-liquid contact with a non-volatile organic liquid, immiscible with the aqueous system such that the organic matter migrates from the aqueous system into the organic liquid, and thereafter recycling the aqueous capturing system to the first step of the two-step capturing treatment, while recovering the volatile organic matters from the non-volatile organic liquid according to a method known. The aqueous capturing system and the non-volatile organic liquid are chosen such that the organic liquid has a higher distribution ratio of the organic matter than the aqueous capturing system. The method attains recovery of resources from a gas or gas mixture simultaneously with the prevention of air-pollution.

6 Claims, 6 Drawing Figures

METHOD OF RECOVERING VOLATILE ORGANIC MATTERS

BACKGROUND OF THE INVENTION

1. Field of the Invention

The present invention relates to a method of recovering sparingly water-soluble or water-insoluble volatile organic matter from a gas or gas mixture containing the organic matter. More particularly, the present invention relates to a method of effectively recovering sparingly water-soluble or water-insoluble volatile organic matter from a gas or a gas mixture, such as air or industrial off-gas, having the organic matter diffused thereinto in the form of vapor, mist and/or small droplets even at a relatively low concentration according to a simple two-step capturing treatment wherein the gas or gas mixture is first brought into gas-liquid contact with a specific aqueous capturing system and the aqueous capturing system is then brought into liquid-liquid contact with an organic liquid which is immiscible with the aqueous capturing system and has a higher distribution ratio of the organic matter than that aqueous capturing system.

2. Description of the Prior Art

In recent years, a large amount of volatile organic matter such as fuels and various kinds of organic solvents are diffused into the air with the rapid development of industry and transportation means causing air pollution, including the generation of the so-called photochemical smog and the like physiologically harmful atmosphere, which is now taken up as one of the big social problems to be solved. In general, such volatile organic matter are liquids sparingly soluble or insoluble in water and are unavoidably exhausted and diffused into the air at a relatively low concentration during operations using such organic matter. Nowadays, such volatile organic matter is consumed or handled as fuels or solvents in various fields of industry, such as the petroleum depot, petroleum refining plants, painting factories, printing factories, rubber-processing factories and general chemical plants, and even in small scale shops such as gasoline stands existing everywhere in cities. Diffusion of such volatile organic matter into the air by evaporation and the like phenomena is indeed considerable, especially in the fields of petrochemistry and various chemical industries, such as the fields of manufacturing and using printing inks and paints, where large amounts of volatile organic solvents and vehicles are consumed.

The existence of a large amount of volatile organic matters at a relatively low concentration in the air, ventilated exhaust and off-gas from the above-mentioned factories and plants creates on the one hand a big social problem of air-pollution harmful to public health, while on the other hand presenting an interesting problem of recovering such organic matter which cannot be overlooked from the viewpoint of effective utilization and saving of resources. Proposed hitherto for recovering volatile organic matter diffused in a gas or gas mixture are an adsorption method wherein the organic matter is adsorbed onto a solid adsorbent and an absorption method wherein the volatile organic matter is absorbed in a liquid absorbent. In these methods, however, a satisfactory adsorption or absorption of the volatile organic matter can be expected only within a short period of time, usually at the initial stage of the operation, because of saturation in adsorption or absorption equilibrium. To say it in another way, the adsorption or absorption capacity of the adsorbent or absorbent decreases rapidly as the operation proceeds. For maintaining a constant high level of adsorption or absorption in these methods, therefore, exchange of the adsorbent or absorbent is required frequently throughout the operation. In a petroleum depot, for example, the amount of volatile fuels actually lost by evaporation in the course of filling or emptying oil tanks or containers is indeed enormous. When the air expelled from the tanks or containers is treated according to the dry adsorption method to recover the volatile fuels, the adsorbent will soon be put in a saturated state so that a steady highly efficient adsorption operation cannot be realized unless the adsorbent is exchanged frequently or an adsorption-desorption treatment carried out frequently. Thus, the dry adsorption method is hardly utilized due to the above disadvantages.

In the absorption method, on the other hand, white oil, spindle oil or the like oil is used as a liquid absorbent. In general, water-insoluble volatile organic matter such as gasoline and toluene are neutral substances and so cannot be absorbed in the acidic or alkaline liquids usually employed for absorption treatments as a liquid absorbent. In addition, water itself cannot be used as the liquid absorbent for such hydrophobic organic matter since, by definition, the organic matter, in principle, is sparingly soluble or substantially insoluble in water. Thus, the less volatile organic liquid materials which are miscible with the water-insoluble volatile organic materials are generally used as a liquid absorbent for capturing the organic matter. In the case of using white oil or spindle oil in such a wet absorption method, however, the phenomenon of saturation is unavoidable because of absorption equilibrium. When a gas or gas mixture containing such volatile organic matter is continuously passed through the same liquid absorbent, the amount of the organic matter absorbed becomes gradually smaller as it approaches the absorption equilibrium. Thus, it is also quite impossible, in the wet absorption method, to perform efficient absorption of the volatile organic matter continuously and economically. For the above reasons, no industrially practical method has been proposed hitherto for effectively recovering volatile organic matter from a gas or gas mixture for the dual purpose of preventing the atmosphere from physiologically harmful pollution and for economically utilizing the organic matter for repeated use. Thus, there is still a great demand for developing a method for effectively recovering volatile organic matter in a simple and economical manner from a gas or gas mixture having the organic matter diffused thereinto.

BRIEF SUMMARY OF THE INVENTION

Accordingly, it is an object of the present invention to provide a method of effectively recovering sparingly water-soluble or water-insoluble volatile organic matter from a gas or gas mixture containing the organic matter even at a relatively low concentration.

It is another object of the present invention to provide a method of recovering volatile organic matter from a gas or gas mixture containing the organic matter batchwise or continuously according to a simple two-step capturing treatment.

It is still another object of the present invention to provide the use of a specific aqueous capturing system for gas-liquid contact with a gas or gas mixture containing the organic matter to absorb the organic matter.

It is a further object of the present invention to provide a method of preventing air from physiologically harmful pollution by recovering the volatile organic matter from ventilated exhaust or off-gas containing the organic matter discharged from factories and plants where a large amount of the organic matter is used.

Other objects, features and advantages of the present invention will become apparent more fully from the following description.

DETAILED DESCRIPTION OF THE INVENTION

The present inventors have made extensive research into the methods of effectively recovering sparingly water-soluble or water-insoluble volatile organic matter, such as fuels of petroleum series and various kinds of organic solvents, from a gas or gas mixture, such as air or off-gas from factories and plants, having the volatile organic matters diffused thereinto possibly at a relatively low concentration. As a result of the research, it has been found surprisingly that an aqueous solution of a certain organic substance can dissolve such volatile organic matter and can effectively be utilized as an aqueous system for capturing the volatile organic matters from a gas or gas mixture containing them and that the organic matter captured by the aqueous system can be removed therefrom into a non-volatile organic liquid which is immiscible with the aqueous system by properly selecting the organic liquid in such a manner that the organic liquid has a higher in distribution ratio of the organic matter than the aqueous capturing system. As a result of further research, it has now been found that such volatile organic matter can effectively be recovered batchwise or continuously and utilized for repeated use when a gas or gas mixture having diffused thereinto the volatile organic matter in the form of vapor, mist and/or small droplets possibly at a relatively low concentration is subjected to a two-step capturing treatment wherein the gas or gas mixture is first treated with an aqueous capturing system capable of dissolving the volatile organic matter to absorb them in the aqueous system and then the aqueous system is treated with a non-volatile organic liquid which is immiscible with the aqueous system, having a larger distribution ratio with respect to the organic matter then the aqueous system, and finally the regenerated aqueous capturing system is recycled to the first step of the capturing treatment while subjecting the organic liquid to a conventional separation treatment such as fractional distillation to separate the volatile organic matters in pure form therefrom. The present invention has been accomplished on the basis of the above findings.

In accordance with the present invention there is provided a method of recovering volatile organic matter from a gas or gas mixture containing the organic matter, characterized by subjecting a gas or gas mixture having diffused thereinto sparingly water-soluble or water-insoluble volatile organic matter in the form of vapor, mist and/or small droplets, to a two-step capturing treatment wherein the gas or gas mixture is first brought into gas-liquid contact with an aqueous capturing system capable of dissolving the volatile organic matter thereby capturing the organic matter in the form dissolved in the aqueous system and then the organic matters-containing aqueous system is brought into liquid-liquid contact with a non-volatile organic liquid immiscible with the aqueous system whereby the organic matter migrates from the aqueous system into the organic liquid, and thereafter recycling the aqueous capturing system to the first step of the two-step capturing treatment, while recovering the volatile organic matters from the non-volatile organic liquid according to well known methods, the aqueous capturing system and the non-volatile organic liquid being so chosen that the organic liquid is higher in distribution ratio of with respect to the organic matter than the aqueous capturing system.

One of the characteristic features of the present invention is to use an aqueous solution of a specific organic substance as a medium for capturing sparingly water-soluble or water-insoluble volatile organic matters. The use of such an aqueous system has never been attempted in the prior art for capturing water-insoluble or -immiscible volatile organic matter contained in a gas or gas mixture.

Sparingly water-soluble or water-insoluble volatile organic matter to be recovered according to the method of this invention from a gas or gas mixture containing the organic matter include, for example, crude oil, refined petroleum fractions such as petroleum ether, benzine, ligroin, gasoline and the like light oils, aliphatic hydrocarbons such as pentane and hexane, aromatic hydrocarbons such as benzene and its ring-substituted derivatives, e.g. toluene and xylene, halogenated hydrocarbons such as trichloroethylene, perchloroethylene, chloroform, carbon tetrachloride and ethyl bromide, esters such as methyl acetate, ethyl acetate, butyl acetate and ethyl benzoate, ketones such as methyl isobutyl ketone, cyclohexanone and isophorone, and ethers such as dibutyl ether. These volatile organic substances are used and consumed in large amounts widely in various fields of industry as fuels, solvents and liquid vehicles. Accordingly, a large amount of such volatile organic matter is consumed by evaporation or the like phenomenon especially in petroleum depots and factories and plants in the fields of chemical industry so that ventilated exhaust and off-gas from these factories and plants contain the organic matters usually at a relatively low concentration.

The specific organic substance used in the aqueous capturing system should be miscible with water to form a homogeneous aqueous solution capable of dissolving the sparingly water-soluble or water-insoluble volatile organic matter. Illustrative of the organic substance are, for example, hemiethers and hemiesters of polyalkylenepolyols such as straight or branched chain alkyl hemiethers and aromatic hemiethers of polyalkyleneglycols and hemiesters of polyalkyleneglycols with carboxylic acids preferably having at least 4 carbon atoms. Preferable examples of the organic substance include diethyleneglycol monomethyl ether, diethylene glycol monoethyl ether, diethyleneglycol monopropyl ether, diethyleneglycol monobutyl ether, triethyleneglycol monomethyl ether, triethyleneglycol monoethyl ether, triethyleneglycol monopropyl ether, triethyleneglycol monobutyl ether, tetraethyleneglycol monomethyl ether, dipropyleneglycol monoethyl ether, hexamethyleneglycol monomethyl ether, diethyleneglycol monophenyl ether, triethyleneglycol monophenyl ether, diethyleneglycol monobutyrate, diethyleneglycol monocaproate, diethyleneglycol octanoate, triethyleneglycol monobutyrate and hexaethyleneglycol monobutyrate. These organic substances can be used alone or as a mixture of at least two.

These organic substances are derived from polyalkylenepolyols preferably having a recurring alkylene unit of 2–30 by etherifying or esterifying one of the terminal hydroxy groups. Thus, the organic substances possess both of the hydrophilic hydroxy group and a leophilic ether or ester linkage in the same molecule. These organic substances are miscible with water but have boiling points high enough to prevent evaporation of the substance in the course of the treatment. In the organic substances, the length of the alkylene moiety and the number of carbon atoms in the ether or ester moiety are properly determined according to the polarity of the volatile organic matter to be recovered. In case the volatile organic substances are compounds of low polarity, such as those of the paraffinic, aromatic or naphthenic series, the number of carbon atoms in the ether or ester moiety is preferably 3 to 6. On the other hand, if the volatile organic substances are compounds of high polarity, such as esters or water-insoluble ketones having, for example, 6–10 carbon atoms, the number of carbon atoms in the ether or ester moiety is preferably 1 to 3. The hemiethers are more chemically stable than the hemiesters and are desirably used when the gas or gas mixture to be treated contains an alkaline substance such as a volatile amine, for example, methylamine in addition to the volatile organic matters to be recovered. An aqueous solution of the organic substance has a very low to moderate viscosity and can effectively capture the volatile organic matter from a gas or gas mixture containing same without any violent foaming at ordinary temperature and pressure.

As the volatile organic substances are absorbed in the aqueous capturing system in the (first) gas-liquid contact treatment to form a homogeneous phase, it is necessary for recovering the organic matter to extract only the organic matter from the aqueous system. For this purpose, the same or similar kinds of the organic matter cannot be used as the extracting agent because such organic matter will also be absorbed in the aqueous system capable of effectively dissolving many similar kinds of organic substances. In the present invention, therefore, the organic liquid used in the (second) liquid-liquid contact treatment for taking up only the organic matter from the aqueous system should be immiscible therewith and higher in the distribution ratio of the organic matter than the aqueous system. This point is also one of the characteristic features of this invention.

The use of such a specific organic liquid permits smooth migration of the organic matter from the aqueous system into the organic liquid at ordinary temperature and pressure without the necessity of any heating or cooling means. Although migration of the volatile organic matter from the aqueous system into the specific organic liquid may depend more or less on the composition of the aqueous system and the sort of the organic liquid, it depends chiefly on whether the organic liquid is higher in distribution ratio of the organic matter than the aqueous system. More precisely, the rates of distribution of the volatile organic matter into both the organic liquid (arbitrarily designated as $D_O$) and the aqueous system (as $D_A$) should satisfy the relation of $D_O > D_A$, i.e. $C_O/C_A > 1$ in terms of distribution (partition) coefficient wherein $C_O$ is the concentration of the organic matter in the organic liquid and $C_A$ is that in the aqueous system, to attain effective migration of the volatile organic matter from the aqueous system into the organic liquid.

Thus, the particular organic liquid is properly selected from such liquid organic materials which are immiscible with the aqueous system and satisfy the requisite of distribution ratio (or coefficient) of the organic substances. In the (second) liquid-liquid contact treatment, the organic liquid should be immiscible with the aqueous system comprising the organic substance and water and should form a heterogenous phase. In this case, the word "immiscible" is used to mean not only "perfectly immiscible" but also "substantially immiscible" so far as the organic liquid forms a heterogeneous phase separated from the aqueous system.

Illustrative of the organic liquid are, for example, non-volatile or high boiling point high molecular liquids of the paraffinic, naphthenic, aromatic, olefinic and ester series which are generally homologues of the volatile organic matter to be recovered. Thus, a particular organic liquid is selected from these high molecular liquid organic substances, taking into consideration the distribution ratio of the volatile organic matters and the sort thereof. For example, dioctyl phthalate which is an ester having a high boiling point is a preferable organic liquid for ethyl acetate as volatile organic matter while liquid paraffin is suitably used for extracting gasoline from the aqueous system. Similarly, methylnaphthalene is suitable for extracting benzene. However, liquid paraffin and spindle oil can be used advantageously for a wide variety of volatile organic matters. Selection of a particular organic liquid for extracting the volatile organic matter from the aqueous system will easily be understood by those skilled in the art, taking the distribution ratio and the sort of organic matter into consideration.

In general, the rate of extraction of the volatile organic matter with the organic liquid from the aqueous system becomes poor when the concentration of the organic substance in the aqueous system is high and the proportion of the aqueous system to the organic liquid is large. It has surprisingly been found that when a small amount of the organic liquid is used for extracting the volatile organic matter from the aqueous system, the concentration of the organic substance in the aqueous system should preferably be low.

The relation between the extraction efficiency of the volatile organic matter and the concentration of the organic substance in the aqueous system is shown in FIGS. 1–4.

Figure 1:
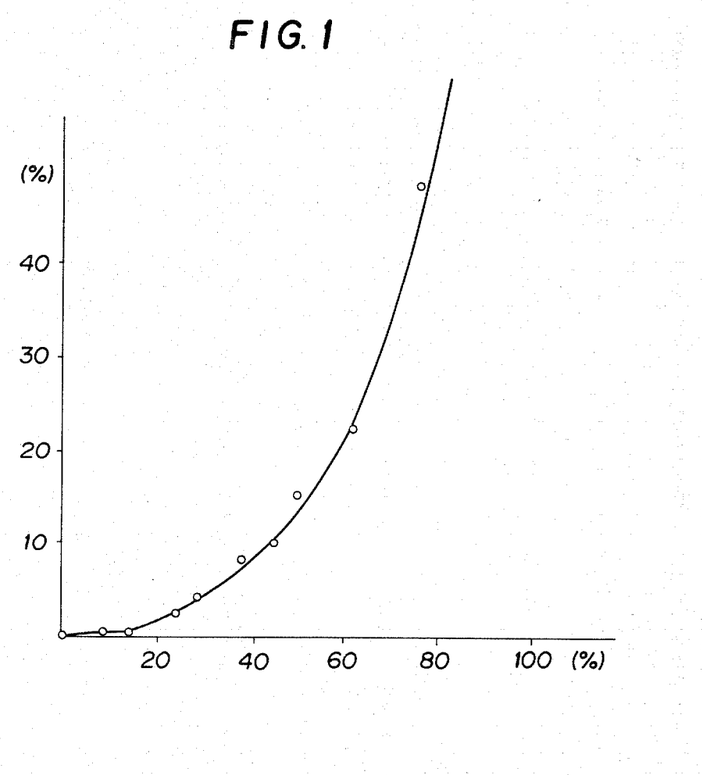
FIG. 1 is a graph showing the relation between the concentration of diethyleneglycol monobutyl ether in an aqueous capturing system and the maximum concentration of toluene dissolved in the aqueous capturing system.

In FIG. 1, this relation is explained by way of a graph with an abscissa standing for the maximum concentration (%) of toluene as volatile organic matter dissolved in the aqueous system and an ordinate standing for the concentration (%) of diethyleneglycol monobutyl ether (BDG) as the organic substance in the aqueous system at 25° C. As is evident from a result shown in the graph, 80 ml of a 60% aqueous solution of BDG can dissolve 20 ml of toluene. This means that a 60% aqueous solution of BDG can absorb toluene from a gas containing toluene until the absorbed toluene reaches an equilibrium of 20 vol.% solution at 25° C. Similarly, the graph shows that 92 ml of a 40 vol.% aqueous solution of BDG can dissolve 8 ml toluene. So far as the concentration of toluene in the aqueous system does not exceed 8 vol.%, therefore, the 40% aqueous solution of BDG can be used for treating a gas containing toluene at any concentration. As far as this relation alone is taken up, it is apparent that the capacity of the aqueous system for absorbing volatile organic matter becomes greater as the concentration of the organic substance in the aqueous system become higher. On the other hand, however, it has been found that influence of the change in the proportion of the aqueous system to the organic liquid on the extraction efficiency becomes smaller as the concentration of the organic substance in the aqueous system becomes lower. This fact is evident from results shown in FIGS. 2–4.

Figure 2:
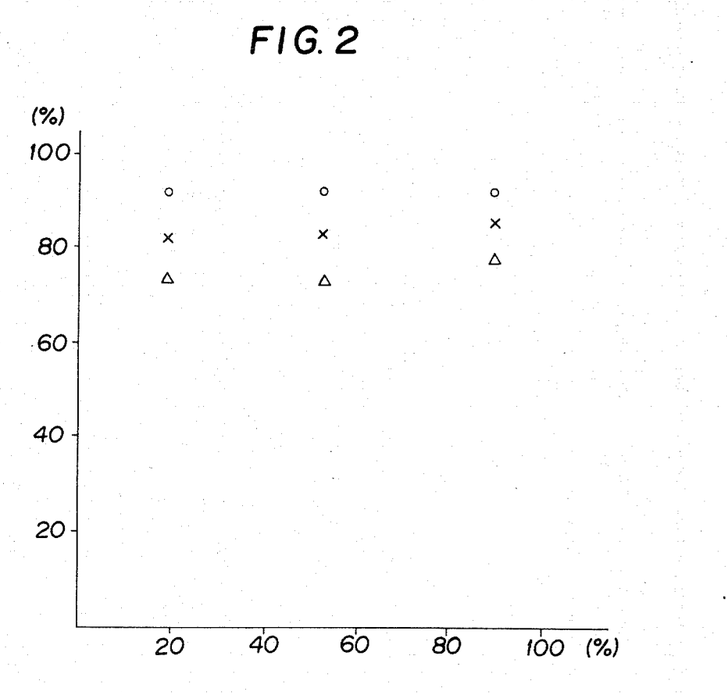
FIGS. 2–4 are graphs showing the extraction efficiencies of toluene in aqueous capturing systems containing diethyleneglycol monobutyl ether at different concentrations, i.e. the relations between the extraction rates of toluene and the rates in concentration of toluene dissolved in aqueous capturing systems containing diethyleneglycol monobutyl ether at different concentrations to the saturated concentrations of toluene in the aqueous capturing systems.

In FIG. 2, a graph with an abscissa standing for the concentration of toluene in terms of percentage to the saturation value (plotting 7.25 vol.% as 100% in this case) and an ordinate standing for the extraction efficiency of toluene shows a result of extracting toluene with liquid paraffin at 25° C. from a 37 vol.% aqueous solution of BDG [BDG/(BDG+water)=37 (vol.%)] having dissolved up to 7.25 vol.% (the maximum concentration, i.e. the saturation value) of toluene. The maximum solubility, i.e. the saturation value (7.25 vol.%) in the concentration of toluene in a 37 vol.% aqueous solution of BDG can easily be obtained from FIG. 1 where the value 7.25 can be read out on the ordinate corresponding to the point of intersection between the curved line and a vertical line extending from the value 37 on the abscissa.

The extraction efficiency shown in FIG. 2 was measured at 25° C. using liquid paraffin as organic liquid in a different proportion. In FIG. 2, the conditions for the measurement are as follows:

FIG. 2

Aqueous capturing system: BDG/(BDG+water)=37 (vol.%)
Toluene dissolved in the aqueous system: up to 7.25 vol.% (max. solubility)
Abscissa: the concentration of toluene in terms of percentage to the maximum solubility as 100
Ordinate: extraction efficiency (at 25° C.)
Organic liquid (extracting agent): liquid paraffin
Proportion of the aqueous capturing system to the organic liquid:
◯ . . . aqueous capturing system/liquid paraffin 10:10
X . . . aqueous capturing system/liquid 10:5
△ . . . aqueous capturing system/liquid paraffin 10:3

In the same manner as described with respect to FIG. 2, except that the concentration of BDG in the aqueous system was varied and the maximum solubility of toluene therein was accordingly changed, the extraction efficiency was measured to investigate the influence of the concentration of BDG in the aqueous system on the extraction efficiency with the organic liquid. Results of the measurements and conditions therefor are shown in FIGS. 3 and 4.

Figure 3:
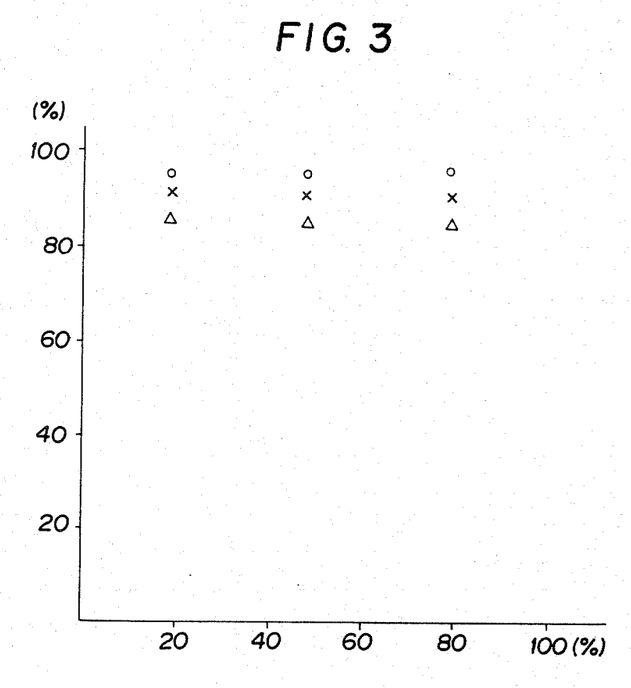

FIG. 3

Aqueous capturing system: BDG/(BDG+water)=29 (vol.%)
Toluene dissolved in the aqueous system: up to 4.28 vol.% (max. solubility)
Abscissa: identical with the case of FIG. 2
Ordinate: identical with the case of FIG. 2
Organic liquid (extracting agent): liquid paraffin
Proportion of the aqueous capturing system to the organic liquid:
identical with the case of FIG. 2

Figure 4:
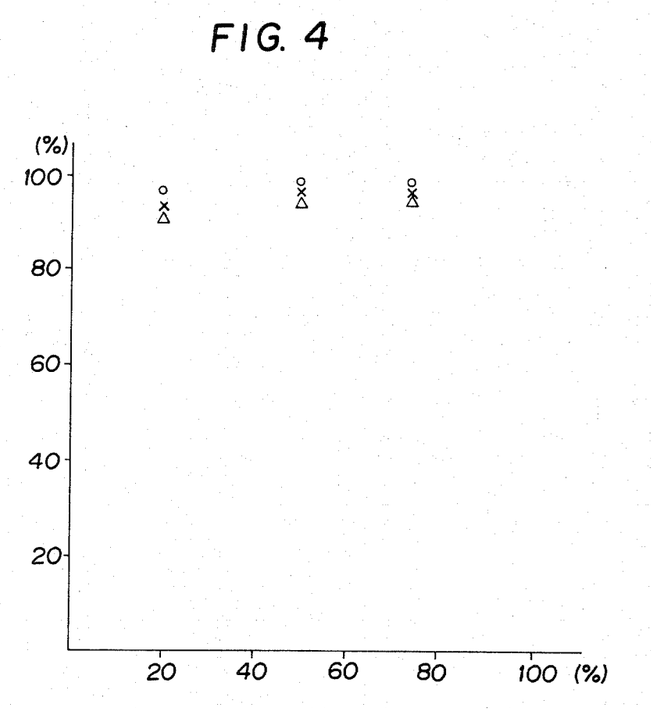

FIG. 4

Aqueous capturing system: BDG/(BDG+water)=20 (vol.%)
Toluene dissolved in the aqueous system: up to 1.7 vol.% (max. solubility)
Abscissa: identical with the case of FIG. 2
Ordinate: identical with the case of FIG. 2
Organic liquid (extracting agent): liquid paraffin
Proportion of the aqueous capturing system to the organic liquid:
identical with the case of FIG. 2

As is evident from these FIGS. 2-4, when the concentration of BDG in the aqueous system is high, reduction of the extraction efficiency in case of decreasing the proportion of liquid paraffin to the aqueous system becomes significant. When the concentration of BDG is low, reduction of the extraction efficiency in case of decreasing the proportion of liquid paraffin to the aqueous system becomes extremely small. For example, when the concentration of BDG in the aqueous system goes down to about 20 vol.%, no substantial change is observed in the extraction efficiency even in the event the proportion of liquid paraffin to the aqueous system is decreased.

What is understood from these results is that the use of a low concentration of the organic substance in the aqueous capturing system results in reduction of the amount of volatile organic matter absorbed in the system but on the other hand permits the use of only a small amount of the organic liquid for effective extraction of the absorbed volatile organic matters from the aqueous system. This is also one of the characteristic features of the present invention and serves to minimize the amounts of the organic substance and liquid used for recovering the volatile organic matters in a high efficiency.

More precisely, the use of a 37 vol.% aqueous solution of BDG can dissolve toluene in an amount up to 7.2 vol.% as shown in FIG. 1. If this aqueous solution has absorbed 7.2 vol.% of toluene, its toluene-absorbing capacity will become 0%. Thus, the use of the aqueous capturing system should generally be stopped just before the stage that the concentration of the volatile organic matters reaches the maximum saturation value. The result shown in FIG. 2 is to explain whether or not toluene absorbed in the aqueous system can be extracted with liquid paraffin in a high efficiency when the concentrations of toluene absorbed in a 37 vol.% aqueous solution of BDG are 90%, 55% and 20% of the maximum saturation value. In the event a liquid-liquid extraction ratio (the aqueous system/liquid paraffin) is 10:3 (the experiment designated by Δ), the extraction efficiency is 77% for the case wherein the concentration of toluene in the aqueous system is 90% of the maximum saturation value and 75% for the case wherein the concentration of toluene in the aqueous system is only 20% to the maximum saturation value. This result apparently shows that even if the concentration of the volatile organic matters absorbed in the aqueous system does not reach the maximum saturation value, the extraction efficiency is almost equivalent to the case wherein the concentration of the volatile organic matter absorbed in the aqueous system reaches the saturation value. In the cases of FIGS. 3 and 4 wherein the concentration of BDG in the aqueous system is lower than the case of FIG. 2, this tendency becomes significant; the extraction efficiency is not influenced by unsaturated low concentrations of toluene in the aqueous system. In addition, the function of the aqueous system for absorbing the volatile organic matters is regenerated easier in the event that the concentration of the organic substance in the aqueous system is lower. This effect will be described later with reference to FIG. 6.

Figure 5:
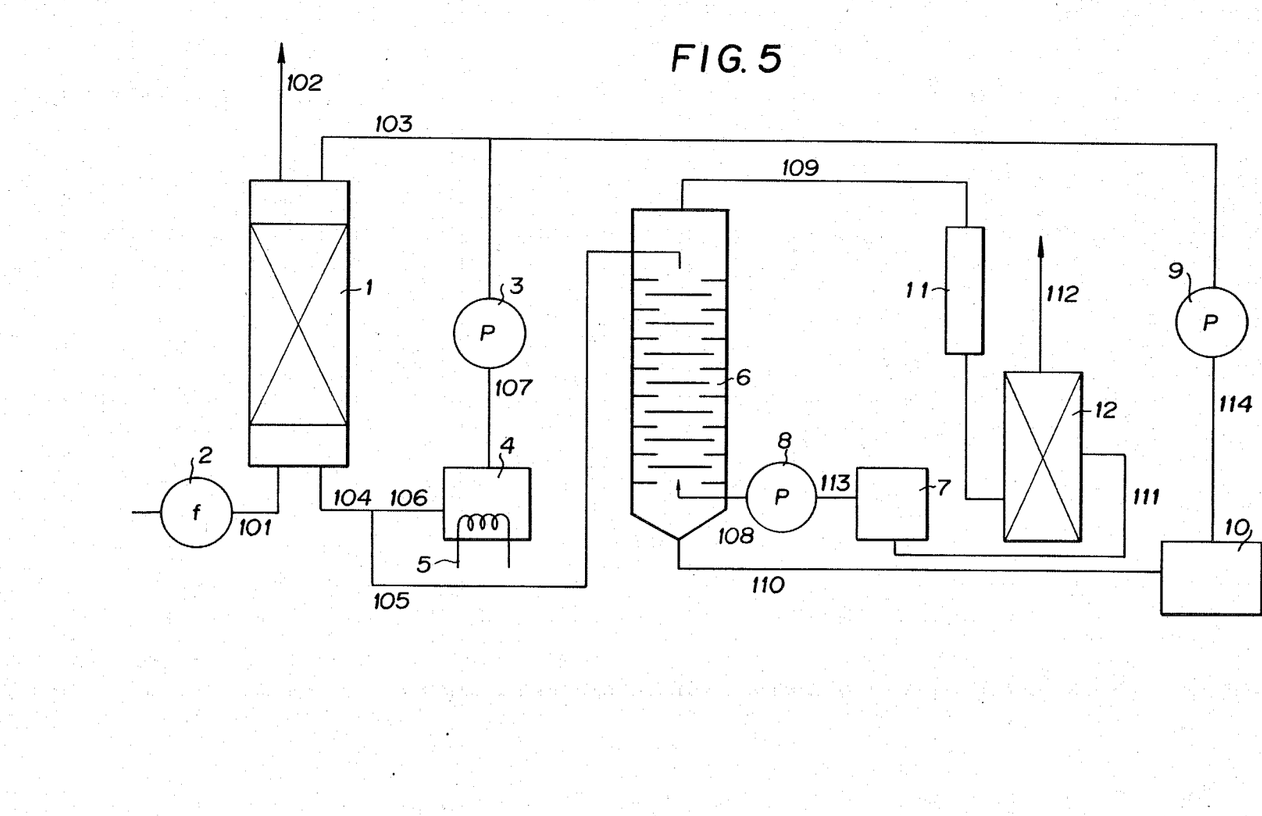
FIG. 5 is a flow sheet showing a typical embodiment for carrying out the method of this invention.

The method of this invention will now be illustrated in more detail with reference to the flow sheet shown in FIG. 5 for a typical embodiment of this invention.

Air containing vapor of toluene in an amount of 140 ppm is introduced at ordinary temperature by the aid of a feed fan 2 at a flow rate of 100 m³/minute into an absorption column 1 through a pipe line 101 connected to the bottom of the column 1. The absorption column 1 is filled with Raschig rings (0.5 inch). On the other hand, a 35 vol.% aqueous solution of BDG maintained at 20° C. is introduced at a flow rate of 1 m³/minute by the aid of a circulation pump 3 into the column 1 through a pipe line 103 connected to the top of the columnn. In the absorption column 1, the air is countercurrently brought into gas-liquid contact with the aqueous solution of BDG, whereby the toluene vapor contained in the air is absorbed in the aqueous solution. The air scrubbed with the aqueous solution of BDG is then allowed to go out from the column 1 through a gas outlet 102. The aqueous solution of BDG having the toluene dissolved therein is then discharged from the column 1 through a pipe line 104 extending from the bottom of the column and conveyed to the upper part of the recovery column 6 through a pipe line 105. A part of the aqueous solution is collected through a pipe line 106 in a reservoir 4 provided with a heat exchanger 5 which is used, if necessary, for adjusting the liquid temperature of the aqueous solution of BDG by passing a heating or cooling medium through the exchanger pipes. The aqueous solution of BDG collected in the reservoir 4 is sent through a pipe line 107 to the pump 3 for recirculation, if necessary. Liquid paraffin as an extracting organic liquid pooled in a reservoir 7 is sent through a pipe line 113 to a pump 8 and introduced into the lower part of the recovery column 6 through an inlet 108. In the recovery column 6, the toluene-containing aqueous solution of BDG is brought countercurrently into liquid-liquid contact with the liquid paraffin whereby the toluene is migrated from the aqueous solution of BDG into the liquid paraffin. By this treatment, the capacity of the aqueous solution for absorbing toluene is regenerated. The aqueous solution thus regenerated is conveyed through a pipe line 110 to a reservoir 10 and recirculated, if necessary, to the absorption column 1 by the aid of a pump 9 through pipe lines 114 and 103.

The concentration of toluene in the vented air at the gas outlet 102 is 7 ppm, thus showing an excellent elimination rate of 95%.

The aqueous solution of BDG in the reservoir 4 may be recycled to the absorption column 1 by the aid of the pump 3 until the absorption capacity of the aqueous solution is decreased. The liquid paraffin into which the toluene has been migrated is discharged at the top from the column 6 and conveyed through a pipe line 109 to a drying unit 11 (optional) where any contaminant moisture or the like material is removed from the liquid paraffin. The product flow of the liquid paraffin is then introduced into a separator 12 of any conventional type where the toluene is separated and taken out through a pipe line 112. The liquid paraffin likewise separated is collected through a pipe line 111 in the reservoir 7 and may be recycled to the recovery column 6 until the extraction capacity is decreased.

Any of the absorption columns usually employed for gas-liquid contact, such as a packings-filled column, a spray column, and a liquid film column, can be used as the absorption column 1. Any of the multi-plate extraction columns such as those for the CCD method may be used as the recovery column 6. A conventional dehydrating agent such as sodium sulfate, calcium chloride may be used in the optional drying unit 11. In a typical case, the separator 12 may be a fractional distillation column where toluene having a lower boiling point can be separated by distillation under atmospheric or subatmospheric pressure from liquid paraffin having a higher boiling point.

The flow rates of the gas, the aqueous capturing system and the extracting organic liquid, the temperatures of these materials, the sorts of the organic substance and the organic liquid, the proportion of the aqueous capturing system to the organic liquid, and the relative amount of these treating liquids to a gas to be treated can easily be determined experimentally or theoretically according to the purpose of removing the volatile organic matters and according to the preliminarily established rate of eliminating the volatile organic matters.

It is one of the merits of this invention that all the treatments except the conventional separation treatment in the separator 12 may be carried out at ordinary temperature and pressure without the positive necessity of using a heating or cooling means and vacuum. It is also another merit of this invention to perform the method batchwise or continuously at need with small amounts of the organic substance and liquid.

Figure 6:
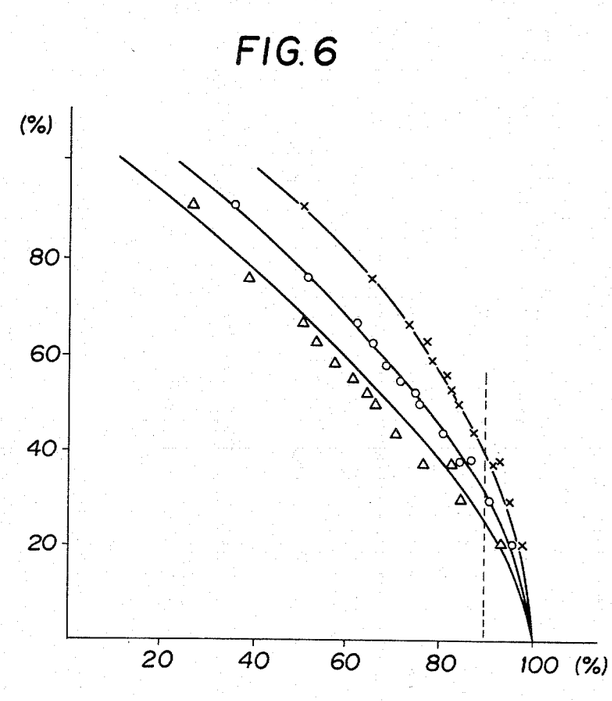
FIG. 6 is a graph showing the relation between the extraction rate of toluene with liquid paraffin and the concentration of diethyleneglycol monobutyl ether in the aqueous capturing system.

In a graph of FIG. 6 with an abscissa standing for the extraction efficiency (the concentration of toluene in terms of percentage to the maximum saturation value) and an ordinate standing for the concentration of BDG in the aqueous system containing toluene, one of the characteristic features of this invention with respect to the proportion of the organic substance and the organic liquid is explained in detail. The conditions for the experiments concerning FIG. 6 are as follows:

FIG. 6

Proportion of the aqueous capturing system to the organic liquid:

X . . . aqueous capturing system/liquid paraffin 10:10

○ . . . aqueous capturing system/liquid paraffin 10:5

△ . . . aqueous capturing system/liquid paraffin 10:3

As is evident form the result shown in FIG. 6, the extraction efficiency for toluene is about 30–60% in case of using a 80% aqueous solution of BDG but the extraction efficiency is increased to more than 90% in case of using a 20% aqueous solution of BDG. In addition, the extraction efficiency is scarcely influenced by change in the proportion of the aqueous solution to liquid paraffin. This means that recovery of the volatile organic matters can be made in a high efficiency with a small amount of the organic liquid and the volatile organic matters can be recovered in concentrated state from the organic liquid. Thus, the energy required for recovery of the volatile organic matter is remarkably reduced and the organic substance and the organic liquid can repeatedly be used without further purification.

Thus, the present invention is featured by a specific combination of (a) the use of an aqueous capturing system in the first gas-liquid contact treatment, (b) the selection of the organic liquid having a higher distribution ratio with respect to the volatile organic matter than the aqueous capturing system and (c) the use of the organic substance at a low concentration in the aqueous capturing system can achieve the following advantages:

(1) As the aqueous capturing system is not inflammable, the treatment is simpler, less dangerous and costless.
(2) The volatile organic matters can be recovered in a very high efficiency by using a relatively small amount of the organic liquid.
(3) The treatment can be carried out continuously as the aqueous system and the organic liquid can readily be regenerated without further purification.
(4) No particular facilities are needed for carrying out the invention.
(5) Overall system is simple.
(6) Recovery of resources and prevention of air-pollution can simultaneously be attained.

It is apparent that the present invention is very useful and applicable to various fields of industry as an effective means for preventing environmental pollution and recovering resources.

It is understood that the preceding representative embodiment may be varied within the scope of the present specification both as to the organic substance and liquid and the treatment conditions, by those skilled in the art to achieve essentially the same results.

As many widely different embodiments of this invention may be made without departing from the spirit and scope thereof, it is to be construed that this invention is not limited to the specific embodiments thereof except as defined in the appended claims.

What is claimed is:

1. A method of recovering volatile organic matter from a gas or gas mixture containing said organic matter, which comprises subjecting a gas or gas mixture having diffused thereinto sparingly water-soluble or water-insoluble volatile organic matter in the form of vapor, mist and/or small droplets to a two-step capturing treatment wherein said gas or gas mixture is first brought into gas-liquid contact with an aqueous capturing system comprising an aqueous solution of a hemiether or hemiester of a polyalkylenepolyol selected from at least one member of the group consisting of diethyleneglycol monobutyl ether, triethyleneglycol monobutyl ether, diethyleneglycol monophenyl ether, triethyleneglycol monophenyl ether, hexaethyleneglycol monobutyrate, diethyleneglycol monobutyrate and triethyleneglycol monobutyrate capable of dissolving said volatile organic matter thereby capturing the organic matter dissolved in said aqueous system and then bringing the organic matter-absorbing aqueous system into liquid-liquid contact with a non-volatile organic liquid, immiscible with said aqueous system, such that said organic matter migrates from said aqueous system into said organic liquid, and thereafter recycling the aqueous capturing system to the first step of said two-step capturing treatment, while recovering said volatile organic matter from said non-volatile organic liquid, said aqueous capturing system and said non-volatile organic liquid being so chosen that said organic liquid has a higher distribution ratio with respect to said organic matter than said aqueous capturing system.

2. A method according to claim 1, wherein said volatile organic matter is selected from fuels, organic solvents and vehicles.

3. A method according to claim 1, wherein said non-volatile organic liquid is selected from non-volatile high molecular liquids of the paraffinic, naphthenic, aromatic, olefinic and ester series.

4. A method according to claim 3, wherein said non-volatile organic liquid is selected from liquid paraffin and spindle oil.

5. A method according to claim 1, wherein said gas mixture comprises air, ventilated exhaust and off-gas from factories and plants.

6. A method according to claim 1, wherein said aqueous capturing system contains a low concentration of said hemiether or hemiester of polyalkylenepolyol and said non-volatile organic liquid is present in a small amount.

* * * * *